United States Patent Office 3,549,572
Patented Dec. 22, 1970

3,549,572
ENHANCEMENT OF RESISTANCE OF OLEFIN POLYMERS TO COPPER-CATALYZED OXIDATIVE DEGRADATION
Motonobu Minagawa and Kenichi Nakagawa, Tokyo, Japan, assignors to Argus Chemical Corporation, Brooklyn, N.Y., a corporation of Delaware
No Drawing. Filed Apr. 17, 1968, Ser. No. 721,919
Claims priority, application Japan, Apr. 18, 1967, 42/24,272
Int. Cl. C08f 45/58
U.S. Cl. 260—23
15 Claims

ABSTRACT OF THE DISCLOSURE

Mercapto and thio hydrazides and/or ureides are provided which are useful in the enhancement of the resistance of olefin polymers to copper-catalyzed oxidative deterioration.

In addition, there are also provided stabilizer compositions consisting essentially of at least one olefin polymer stabilizer and a mercapto or thio hydrazide and/or ureide; olefin polymer compositions, such as propylene polymer compositions, containing a mercapto or thio hydrazide and/or ureide; and a process for enhancing the resistance of olefin polymers to copper-catalyzed degradation by incorporation of such compounds or of such stabilizer compositions.

---

This invention relates to novel mercapto and thio hydrazides and/or ureides, which are useful in the enhancement of the resistance of olefin polymers, such as propylene polymers, to copper-catalyzed oxidative deterioration; to stabilizer compositions consisting essentially of at least one olefin polymer stabilizer, and a mercapto or thio hydrazide and/or ureide, and to olefin polymer compositions having an enhanced resistance to copper-catalyzed degradation in physical properties due to incorporation therein of such compounds or of the above stabilizer composition, and to a process of enhancing the resistance of olefin polymers to copper-catalyzed degradation by incorporation of such compounds or of such stabilizer compositions.

Polypropylene is a tough, hard, relatively flexible, high-melting polymeric material, and thus has a number of important applications, such as, for example, as electrical insulation for copper wires and cables. However, in several respects the stability of polypropylene leaves much to be desired. The polymer shows a tendency to decrease rapidly in melt viscosity and then to become brittle when kept at elevated temperatures for the time required in milling, calendering, extrusion, injection molding, and fiber-forming equipment. This deterioration is particularly serious when the polymers are worked in a molten state in the presence of oxygen, for example, air. It is known in the art that degradation in one or more physical properties of polypropylene due to heat can be inhibited by the incorporatoin of a number of well known thermal antioxidants, including hindered phenols, secondary aromatic amines, organic phosphites, and thiodipropionic acid esters.

A special problem is presented when the polypropylene is contaminated by or is used in contact with copper. Thus, polypropylene employed as insulation for copper wires and cables becomes useless after a few months. In fact, it has been found that oxidative degradation of polypropylene occurs at an extremely rapid rate in the presence of copper, even when the polymer contains effective antioxidants. Hansen et al., Journal of Polymer Science, Part A, 2, 587–609 (1964), report at page 589 that "The catalytic effect of copper on the thermal oxidation of polypropylene is not as drastic in the *absence* of antioxidants as it is in their presence" (Emphasis added). Where polypropylene contains an antioxidant, in the present of copper "the rate of oxidation becomes rapid and constant after a drastically shortened induction period compared with that obtained in the absence of copper" (page 590). "The induction period in oxygen at 140° C. for polypropylene stabilized by the addition of 0.5 weight percent of 4,4' - thiobis(3 - methyl - 6-tert-butylphenol) is decreased from about 400 hours to 40 hours by the presence of copper. Similar 90% losses in the effectiveness of this antioxidant in the presence of copper have been observed over a range of temperatures" (page 591).

To inhibit copper-catalyzed oxidation, conventional copper chelating agents and metal deactivators have been added to polypropylene compositions containing thermal antioxidants. As reported by Hansen et al., supra, at page 593, "All of these materials were found to be unsatisfactory for a variety of reasons. Most of them did not diminish the catalytic activity of copper and copper compounds. Some actually accelerated the already rapid copper-catalyzed oxidation of polypropylene, and might be useful in other reactions where oxidation is sought rather than avoided. The best of the conventional deactivators (for example, N,N'-di-β-naphthyl-p-phenylenediamine) were only slightly effective in curtailing the catalytic activity of copper." It is also reported that other conventional and commercial metal inhibitors or deactivators, such as ethylenediamine tetraacetic acid and its salts, 2,2'-bipyridyl, 8-quinolinol, N,N'-disalicylidene-1,2-propanediamine, and benzimidazole, either were ineffective or only slightly effective, and usually had other disadvantages, including instability, incompatibility, water-solubility, volatility, formation of highly colored products, and reaction with other components of the polypropylene composition.

A number of compounds have been suggested, for use in suppressing copper-catalyzed oxidation of polypropylene. Hansen et al, supra, and British Pat. No. 974,274, to Western Electric Company, Inc., recommend oxamide and compounds derived from oxamide which contain the radical

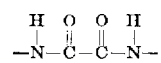

for inhibiting copper-catalyzed oxidation of polypropylene. Hansen et al. report that polypropylene compositions containing 0.5% by weight antioxidant and 0.5% by weight oxamide or substituted oxamide retained between 30 to 80% of the effectiveness of the antioxidant in the presence of copper, while when oxamide or its derivatives were not used, only between 1 and about 15% of the normal induction period for an antioxidant was observed.

Hansen et al., Polymer Engineering and Science, vol. 5 October 1965, pages 223 to 226, reported that nitrobenzohydrazides, oxalyldihydrazide and its derivatives, triazines, triazoles, triazolines, and tetrazoles, are effective copper inhibitors. However, many of these compounds destroy the effectiveness of antioxidants, such as N-phenyl - 2-naphthylamine, 4,4'-thiobis(3-methyl-6-tertiary-butylphenol) and 6,6'-di-tert-butyl-4,4'-bis-o-cresol.

A number of other compounds which are apparently useful as copper deactivators and inhibit copper-catalyzed oxidation of polypropylene are known. U.S. Pat. No. 3,110,696 to Dexter discloses compounds of the formula

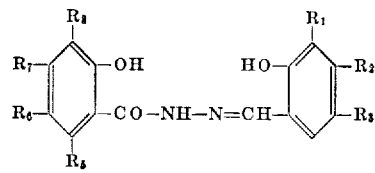

wherein the R radicals are hydrogen, alkyl, alkoxy or phenyl. Dexter prefers N'-salicylidene-N'-salicylhydrazide.

U.S. Pat. No. 3,117,104 to Bown et al. discloses oxaldihydrazides having the formula

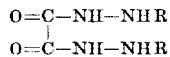

where R is an alkyl of up to sixteen carbon atoms, monoaryl or naphthenyl, having from five to twelve carbon atoms. Such compounds are shown to reduce the stabilizing effectiveness of dilauryl thiodipropionate in the presence of copper by about 75%.

British Pat. No. 994,116 to Shell teaches that stabilizer combinations which contain (a) an organic sulfur compound of the type $R_1$—$S_xR_2$, wherein $x$ is an integer of up to 2 and $R_1$ and $R_2$ are alkyl, aralkyl, or cycloalkyl, having from eight to twenty-five carbon atoms and (b) a polynuclear polyphenol consisting of a benzene ring substituted with $n$ 3,5-dialkyl-4-hydroxybenzyl groups wherein $n$ is 3 or 4, are effective in protecting alkene polymers, prepared by a low-pressure polymerization process, such as the Ziegler process, against deterioration caused by light, heat and oxygen. However, it is stated that these stabilizer compositions are incapable of protecting the polymer effectively against deterioration in properties caused by contact between copper and polymer. In discussing the prior art, it is indicated that British Pat. No. 890,761 discloses stabilizer combinations offering protection against deterioration caused by contact between copper and polymer, viz. a combination comprising a diester of a beta-thiodipropionic acid and a bisphenol obtained by the condensation reaction of 1 mol of saturated aldehyde or ketone having 4 to 6 carbon atoms or of sulphur dichloride and 2 mols of a phenol having a non-reactive ortho substituent and a non-substituted para ring carbon atom. British Pat. No. 951,931 also discloses the incorporation of a diester of beta-thiodipropionic acid in combination with a certain trisphenolic compound which is obtained by the condensation reaction of either 1 mol of unsaturated aldehyde or ketone and 3 mols of phenol having a non-reactive ortho or para hydrocarbon substituent, or 1 mol of hydroxyaryl-substituted saturated aldehyde or ketone and 2 mols of phenol having a non-reactive ortho or para hydrocarbon substituent, into polymers in order to stabilize the latter against deterioration caused by contact with copper.

However, British Pat. No. 994,116 states at page 2, column 1, that "the stabiltiy of such polymer compositions containing the relevant stabilizer combinations comprising these diesters plus said bis- or trispheonolic compounds leaves much to be desired when these compositions—whether or not in contact with copper—are exposed to elevated temperatures. This gives rise to serious difficulties during the manufacture of the insulated electric conductors from which the insulating material consists of such stabilized compositions, since these are manufactured by coating the conductor with heat-plastified or molten polymer material. As is known, high temperatures, generally higher than 150° C., are used when such coatings are applied. Moreover, electric conductors coated with such stabilized compositions are, of course, not very suitable for use at elevated temperatures."

British Pat. No. 994,116 suggests that this problem can be met by incorporating in the polymer together with the organic sulfur compound and a polynuclear polyphenol, a bis- or trisphenolic compound obtained by the reaction of either a saturated or unsaturated aldehyde or ketone, of sulfur dichloride, and a phenol having at least one ortho-ring carbon atom bound to a secondary or tertiary alkyl group. Apparently, the bis- or trisphenolic compound when employed with the above stabilizers protects the polymer against deterioration caused by contact between copper and polymer even when the polymer is exposed to elevated temperatures, such as 150° C. and above.

British Pat. No. 951,936 to Imperial Chemical Industries, Limited, discusses the problem of protection of polyolefins containing phenolic antioxidants against copper-catalyzed oxidatives deterioration. The phenolic compounds are said to be especially effective as antioxidants when they are used in conjunction with an organic sulfur compound having a molecular weight of at least 250. This patent provides a polymeric composition suitable for use in close contact with copper, which composition comprises a solid polymer of propylene, particularly isotactic polypropylene, a phenolic antioxidant, and non-volatile primary or secondary aromatic or aliphatic amino compounds, the secondary aromatic amino compounds having at least one nitrogen atom to which is attached not more than one aryl group. These amines are, in general, not those which are generally preferred as antioxidants in rubber and plastics: Many of these amino compounds, e.g., p-aminoacetanilide, do not confer any extra protection on polypropylene stabilized with mixtures of phenolic compounds and sulphur compounds in the absence of copper, and do not prevent the degradation of polypropylene in the presence of copper when they are used in the absence of the phenolic stabilizer. The aliphatic amino compounds usually cause less staining than the aromatic amino compounds, the acid hydrazides being particularly good in this respect.

U.S. Pat. No. 3,367,907 to Hansen teaches polyolefin compositions stabilized against degradation accelerated by the presence of copper. There is incorporated in the polymer an antioxidant, such as a phenol, and a "copper inhibitor," which can be any azimidobenzene containing the radical:

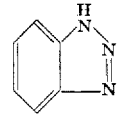

or any corresponding benzotriazine characterized by the structure: ]

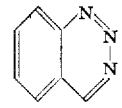

In accordance with the instant invention, five classes of new compounds have been discovered which are useful in olefin polymer compositions, such as polypropylene, containing one or more olefin polymer stabilizers, and which can come in contact with copper.

In the presence of such compounds, the usual catalytic effect of copper on the rate of degradation of the olefin polymer is not observed, and instead, the olefin polymer displays a resistance to degradation, enhanced by the usual olefin polymer stabilizer or stabilizer system, that is virtually as high as though the copper were not present. This is especially surprising in view of the fact that copper substantially reduces the effectiveness of most commercially available antioxidants in olefin polymers even when so called conventional "copper deactivators" are incorporated in the polymer.

Further in accordance with the instant invention, stabilizer systems for olefin polymers are provided consisting essentially of at least one olefin polymer stabilizer and a mercapto or thio hydrazide and/or ureide to substantially reduce and in many cases overcome any depreciative effect of copper on the olefin polymer stabilizer or olefin polymer.

In addition, in accordance with the invention, olefin polymer compositions are provided, such as propylene polymer compositions, consisting essentially of olefin polymer and at least one mercapto or thio hydrazide and/or ureide.

Olefin polymer compositions of the invention containing a mercapto or thio hydrazide and/or ureide can be used in contact with copper and can be combined with the usual olefin polymer stabilizers to enhance resistance to oxidative deterioration. Consequently, such olefin polymer compositions include, optionally, at least one olefin polymer stabilizer.

Further in accordance with the instant invention, a process for enhancing the resistance of olefin polymers, such as propylene polymers, to copper-catalyzed oxidative deterioration is provided, which comprises incorporating in the olefin polymer at least one mercapto or thio hydrazide and/or ureide as defined herein, and optionally, at least one olefin ploymer stabilizer.

The olefin polymer stabilizers which can be employed in the invention include, for instance, phenols, organic phosphites, thiodipropionic acid esters, polyvalent metal salts of organic acids, and hydrocarbon sulfides and polysulfides, and conventional olefin polymer light stabilizers as will be seen hereinafter.

The mercapto and thio hydrazides and/or ureides in accordance with the invention have the following structures.

I 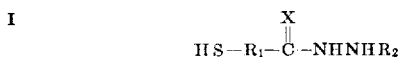
II 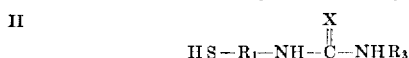
III 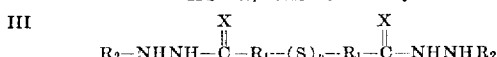
IV 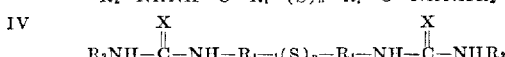
V 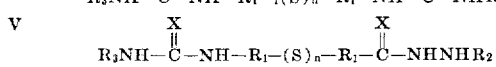

X is selected from the group consisting of oxygen or sulfur.

$n$ is an integer of from 1 to 2.

$R_1$ is a bivalent group selected from the group consisting of alkylene radicals containing from one to about two carbon atoms and alkylene radicals including as substituent alkyl having from one to about twelve carbon atoms, aryl having from six to about ten carbon atoms, hydroxyl, and halogen groups, and arylene radicals containing from about six to about ten carbon atoms, and such radicals including the substituents named above, nitro and alkoxy having from one to about twelve carbon atoms.

$R_2$ is selected from the group consisting of hydrogen, alkyl having from one to about twelve carbon atoms, aryl having from six to about ten carbon atoms, and alkaryl and aralkyl having from seven to about ten carbon atoms, and such radicals including any of the above substituents, and mercapto,

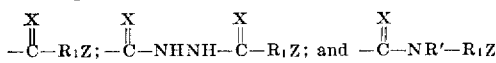

wherein Z is selected from the group consisting of hydrogen, hydroxyl and mercapto groups; and R' is selected from the group consisting of hydrogen and alkyl radicals having from one to about four carbon atoms, and X and $R_1$ are as defined above; and $R_3$ is selected from the group consisting of hydrogen,

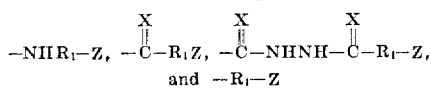

wherein Z, $R_1$ and R' are as defined hereinbefore.

In each of the above structures, the R's and X's in the same compound may be the same or different.

The halogen can be chlorine, bromine or iodine.

Where the $R_1$ arylene group is linked to a sulfur atom and/or a

group, the sulfur atom and the $$\overset{X}{\underset{\|}{C}}$$

group are ortho to each other or to a substituent on the aromatic nucleus.

Typical alkyl groups include methyl, ethyl, propyl, isopropyl, n-butyl, sec-butyl, tert-butyl, pentyl, hexyl, heptyl, n-octyl, iso-octyl, nonyl, decyl, undecyl, dodecyl; typical aryl groups include phenyl and naphthyl, alkaryl and aralkyl groups include tolyl, xylyl, benzyl, and phenethyl; alkoxy groups include methoxy, ethoxy, propoxy, hexyloxy, and lauryloxy.

Typical alkylene radicals include methylene ethylene, 1,2 - dimethylethylene, 1,2 - propylene, butylethylene, dimethyl methylene, 1,1 - ethylidene, 1,1-butylidene,1,1-propylidene, aryl-substituted alkylene radicals, such as

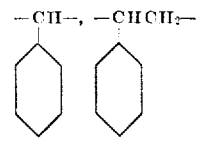

hydroxy-substituted alkylene radicals, such as

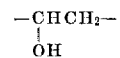

alkylene radicals substituted with halogen, such as

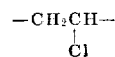

and arylene and substituted arylene radicals, such as

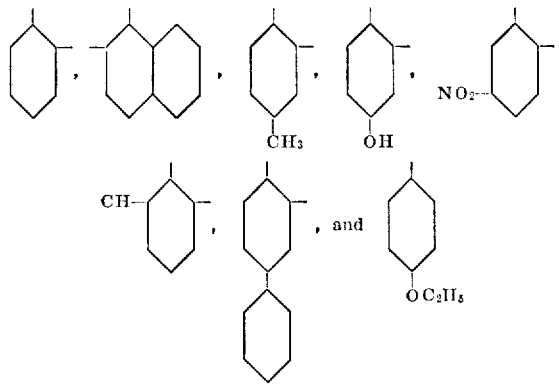

Examples of compounds falling within the invention include:

1. 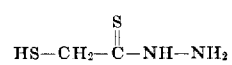

2. 

3. 

4. 

5. 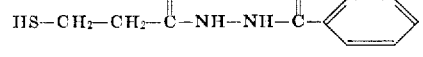

6. 

7. 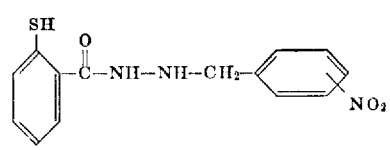

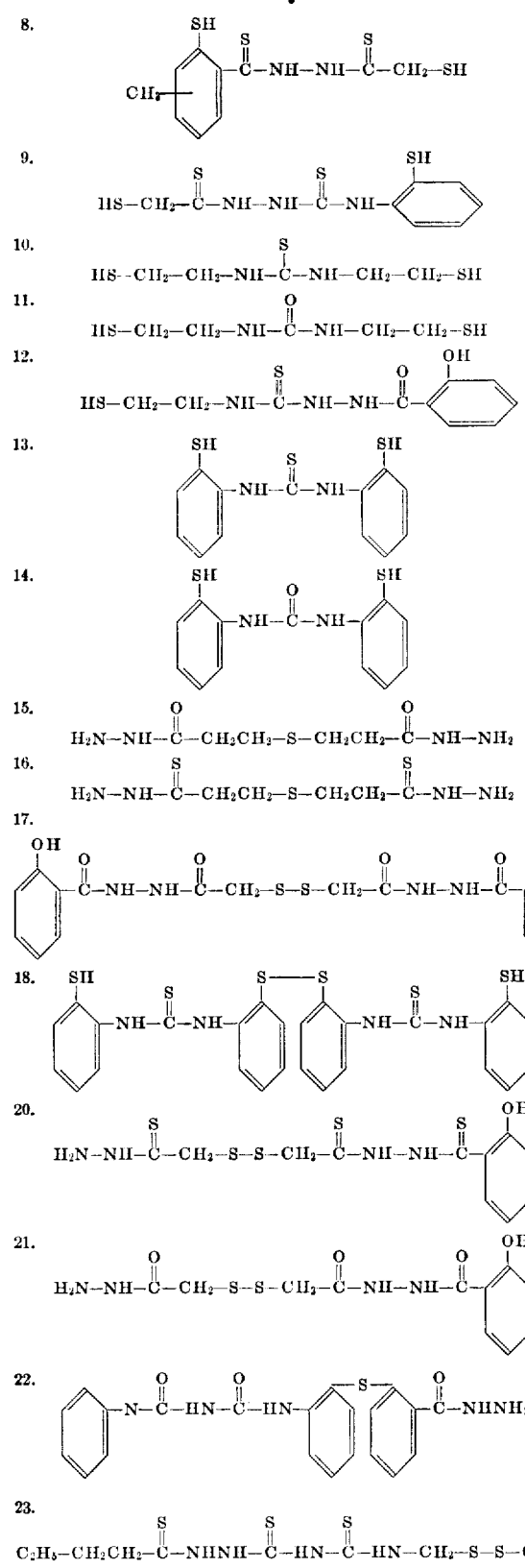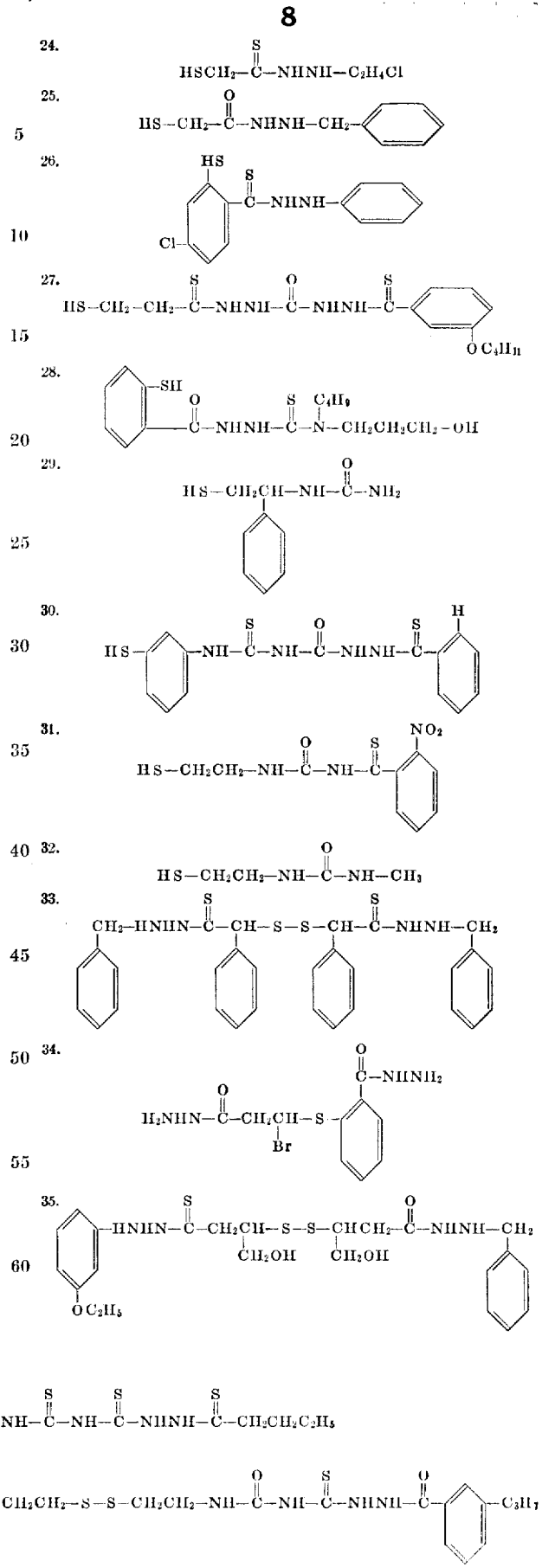

37. 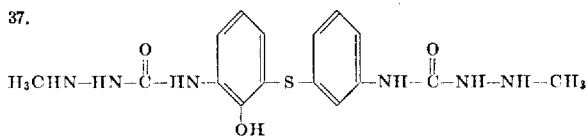

The aforementioned compounds are prepared by know procedures which form no part of the invention. Thus, for example, mercapto hydrazides of the genus

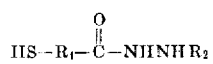

can be prepared by the reaction of a mercapto acid ester and a hydrazine (Kirk-Othmer, Encyclopedia of Chemical Technology, 2nd edition (1966), vol. 11, page 172) for example, in accordance with the following equation:

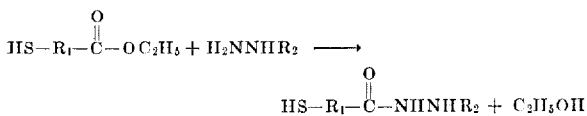

Mercapto thiohydrazides of the genus

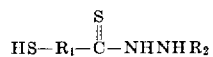

can be prepared by reacting a mercapto carboxylic acid amide with phosphorus pentasulfide to give the thio amide (Kirk-Othmer, Encyclopedia of Chemical Technology, 1st edition, vol. 14, page 62) which can be further reacted with a hydrazine, for example in accordance with the following equation:

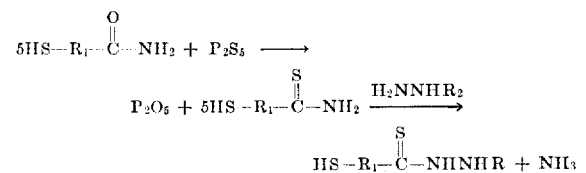

Mercapto ureides and mercapto thioureides of the genus

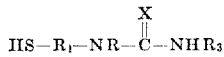

as defined hereinbefore, can be prepared by urea synthesis methods by reaction of a mercaptoamine with an isocyanate or isothiocyanate (Advanced Organic Chemistry, Fuson (1951), at page 526), for example, in accordance with the following equation:

Furthermore, these compounds can be prepared by reaction of mercapto amines with carbon disulfide (Organic Synthesis, V. Migrdichian, vol. 2 (1957), page 1442).

Thio or dithio bis-hydrazides or thio or dithio bis-thiohydrazides of the genus

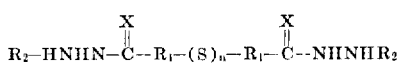

can be prepared in a manner similar to the preparation of the mercapto hydrazides or mercapto thiohydrazides as above, by the reaction of thio or dithio bis(carboxylic acid esters) or thio or dithio bis(thio acid amides) with a hydrazine.

Thio or dithio bis-ureides or thio or dithio bis-thioureides of the genus

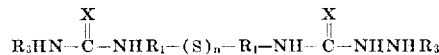

can be prepared in a manner similar to the mercapto ureides and mercapto thioureides as above, by the reaction of thio or dithio bis-amines with isocyanates or isothiocyanates.

Mercapto hydrazide-ureides and mercapto thio hydrazideureides of the genus

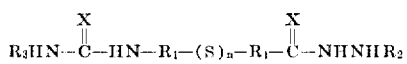

can be prepared by a combination of the above procedures, as will be apparent to those skilled in the art.

The organic phosphite can be any organic phosphite having one or more organic radicals attached to phosphorus through oxygen. These radicals can be monovalent radicals in the case of the triphosphites, diphosphites and monophosphites, which can be defined by the formula:

$$R_1-O-P-O-R_3$$
$$|$$
$$O$$
$$|$$
$$R_2$$

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

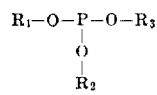

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositions of the invention are mixed heterocyclic-open chain phosphites of the type:

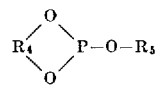

More complex phosphites are formed from trivalent organic radicals, of the type:

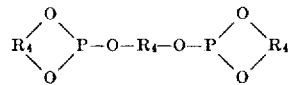

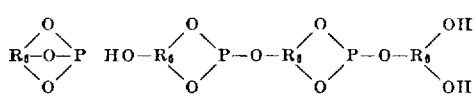

in which $R_6$ is a trivalent organic radical of any of the types of $R_1$ to $R_5$, inclusive, as defined above.

An especially preferred class of organic phosphites have a bicyclic aromatic group attached to phosphorus through oxygen, with no or one or more phenolic hydroxyl groups on either or both of the aromatic rings. These phosphites are characterized by the formula:

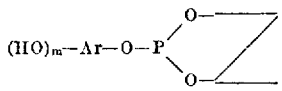

in which Ar is a bicyclic aromatic nucleus and $m$ is an integer of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional bicyclic aromatic groups of the type $(HO)_m$—Ar.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphine, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl)(isooctylphenyl) phosphite, tri(2-cyclohexylphenyl) phosphite, tri-α-naphthyl phosphite, tri(phenylphenyl) phosphite, tri(2-phenyl ethyl) phosphite, monododecyl phosphite, di(p-tert-butyl phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy - 1,3,2 - dioxaphosphorinane, 2-butoxy-1,3,2-dioxaphosphorinane, 2-octoxy-5,5-dimethyldioxaphosphorinane, 2-cyclohexyloxy-5,5-diethyl dioxaphosphorinane, monophenyl phosphite, 2-ethylhexyl phosphite, isooctyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-α-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary of the bis aryl phosphites are: bis(4,4'-thio-bis(2-tertiary butyl-5-methyl-phenol)) isooctyl phosphite, mono(4,4'-thio-bis(2-tertiary-butyl - 5 - methyl-phenol)) di-phenyl phosphite, tri-(4,4'-n-butylidene-bis(2-tertiary-butyl-5-methyl-phenol)) phosphite, (4,4'-benzylidene-bis(2-tertiary-butyl-5-methyl-phenol)) diphenyl phosphite, isooctyl 2,2'-bis(-parahydroxyphenyl) propane phosphite, tridecyl 4,4'-n-butylidene-bis(-2-tertiary butyl-5-methylphenol) phosphite, 4,4'-thiobis(2-tertiary butyl-5-methylphenol) phosphite, 2-ethylhexyl - 2,2' - methylene-bis(4-methyl-6-1'-methylcyclohexyl) phenol phosphite, tri(-2,2'-bis-(parahydroxy phenyl) propane) phosphite, tri (-4,4'-thio-bis (2-tertiary-butyl-5-methyl-phenol) phosphite, isooctyl-(2,6-bis(2'-hydroxy-3,5-dinonylbenzyl) - 4 - nonyl phenyl)) phosphite, tetra-tridecyl 4,4'-n-butylidene-bis(2-tertiary butyl-5-methyl phenyl) diphosphite, tetra-isooctyl 4,4'-thiobis(2-tertiary butyl-5-methyl phenyl) diphosphite, 2,2'-methylene-bis(4-methyl 6-1'-methyl cyclo-hexyl phenyl) polyphosphite, isooctyl-4,4'-isopropylidene-bis-phenyl-polyphosphite, 2-ethylhexyl-2,2'-methylene-bis(4-methyl-6,1'-methyl-cyclohexyl) phenyl triphosphite, tetra-tridecyl-4,4'-oxydiphenyl diphosphite, tetra-n-dodecyl-4,4'-n-butyl-idenebis (2-tertiary-butyl-5-methylphenyl) diphosphite, tetra-tridecyl-4,4'-isopropylidene bisphenyl diphosphite, tri-tridecyl butane-1,1, and 3-tris(2'-methyl-5'-tertiary-butylphenyl-4'-) triphosphite.

The phenol stabilizers contain one or more phenolic hydroxyl groups, and one or more phenolic nuclei and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

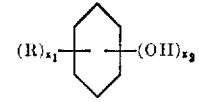

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Polycyclic phenols include aromatic nuclei which are linked by a bivalent linking radical, and are defined by the formula:

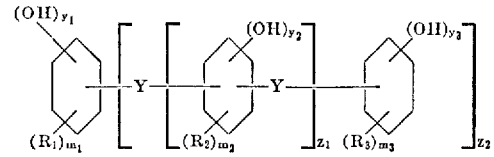

wherein $R_1$, $R_2$ and $R_3$ are inert substituent groups of the type of R above, Y is a bivalent linking radical; $m_1$ is an integer from zero to a maximum of 5- $(z_2+y_1)$, $m_2$ can be an integer from zero to three and $m_3$ an integer from zero to four, $z_1$ can be an integer from zero to about six and $z_2$ an integer from one to five, preferably one. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

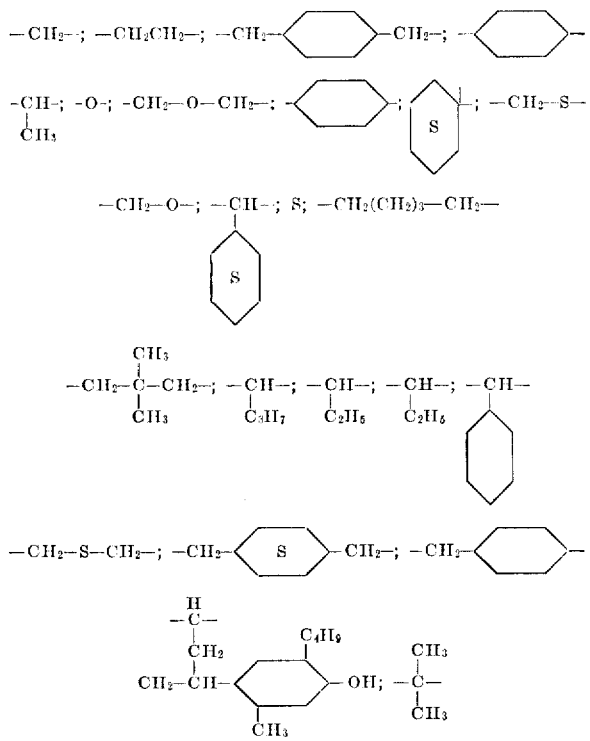

Representative phenols include guaiacol, resorcinol monoacetate, vanillin, butyl salicylate, 2,6-ditert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl phenol, and o-, m- and p-octyl phenol, o- and m-tert-butyl-p-hydroxy-anisole, p-n-decyloxy phenol, p-n-decyloxy cresol, nonyl n-decyloxy cresol, eugenol, isoeugenol, glyceryl monosalicylate, methyl-p-hydroxy-cinnamate, 4-benzyloxyphenol, p-acetylaminophenol, p-stearyl-aminophenol methyl-p-hydroxybenzoate, p-di-chlorobenzoylaminophenol and p-hydroxysalicyl anilide.

Exemplary polyhydric phenols are orcinol, propyl gallate, catechol, resorcinol, 4-octyl resorcinol, 4-dodecyl resorcinol, 4-octadecyl catechol, 4-isooctyl-phloroglycinol, pyrogallol, hexahydroxy benzene, 4-isohexylcatechol, 2,6-ditertiary-butyl resorcinol, 2,6-diisopropyl phloroglucinol.

Exemplary polyhydric bisphenols are methylenebis-(2,6-ditertiarybutyl-phenol),
2,2-bis-(4-hydroxy phenyl)-propane,
methylene-bis(p-cresol),
4,4'-oxobis-(3-methyl-6-isopropyl phenol),
2,2'-oxobis-(4-dodecyl phenol),
4,4'-n-butylidenebis-(2-tertiary butyl-5-methylphenol),
4,4'-benzylidenebis-(2-tertiary butyl-5-methylphenol),
4,4'-cyclohexylidenebis-(2-tertiary butylphenol),
4,4'-thiobisphenol,
4,4'-thiobis(3-methyl-6-tertiary-butylphenol),
2,2'-thiobis(4-methyl-6-tertiary-butylphenol),
2,2'-methylenebis(4-methyl-6-(1'-methyl-cyclohexyl)-phenol),
2,6-bis(2'-hydroxy-3'-tertiary-butyl-5'-methylbenzyl)-4-methylphenol,
1,1,3-tris-(2'-methyl-4'-hydroxy-5'-tertiary butylphenyl) butane.

The thiodipropionic acid ester has the following formula:

$$R_1OOCCH_2CH_2\text{—}S\text{—}CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of $n$ thiodipropionic acid ester units:

XO[OCCH$_2$CH$_2$SCH$_2$CH$_2$COOXO]$_n$
OCCH$_2$CH$_2$—S—CH$_2$CH$_2$COOZ where Z is hydrogen, $R_2$ or M; $n$ is the number of thiodipropionic acid ester units in the chain; and X is a bivalent hydrocarbon group of the type of $R_1$; the value of $n$ can range upwards from 1, but there is no upper limit on $n$ except as is governed by the ratio of carbon atoms to sulfur atoms as stated below; and (d) a polyvalent metal M of Group II of the Periodic Table such as zinc, calcium, cadmium, barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX\text{—}O]_n$
 OCCH$_2$CH$_2$SCH$_2$CH$_2$COOZ
(d) $[R_1OOCCH_2CH_2SCH_2CH_2COO]_2M$ In the above formulae $R_1$ and $R_2$ M, X and Z are the same as before. In the polymer (c), as in the other forms of thiodipropionic acid esters, the total number of carbon atoms per sulfur atom is within the range from about ten to about sixty.

The R radical of these esters is important in furnishing compatibility with the polypropylene. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthy, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

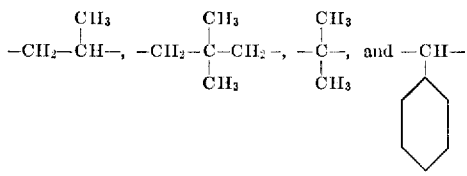

arylene radicals such as phenylene

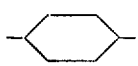

methylenephenylene

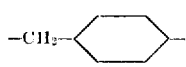

dimethylene phenylene,

and alicyclene radicals such as cyclohexylene

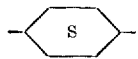

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono-(dodecylbenzyl) thiodipropionic acid.

These esters are for the most part known compounds, but where they are not available, they are readily prepared by esterification of thiodipropionic acid and the corresponding alcohol.

When the compounds of the invention are used in conjunction with a polyvalent metal salt of an organic acid, the polyvalent metal salt of an organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The hydrocarbon sulfides and polysulfides can contain one sulfur atom or two or more sulfur atoms linked in a polysulfide unit. Usually, the sulfides and polysulfides will not have more than fifty carbon atoms. They can be defined by the formula:

$$R(S)_n\text{—}R$$

wherein $n$ is the number of sulfur atoms and ranges from one to about six, and R is an organic radical having from one to about thirty carbon atoms, such as alkyl, aryl, alkaryl, aralkyl, and cycloalkyl. The following compounds are typical: dibutyl sulfide, didecyl sulfide, diphenyl sulfide, dibenzyl sulfide, butyl octyl sulfide, di-n-dodecyl trisulfide, di-tertiary dodecyl disulfide, di-paratertiary butyl phenyl trisulfide, dibenzyl disulfide, dibenzyl tetra sulfide, and dibenzyl trisulfide.

Light stabilizers for olefin polymers can also be added, for example, 2-hydroxy benzophenones, o-hydroxyphenylbenzotriazoles, 1-dioxides of α,β-benzoisothiazolone and 1,3,5-triazines and nickel organophosphites as disclosed in application Ser. No. 487,614, now U.S. Pat. No. 3,395,112, patented July 30, 1968.

The stabilizer system of the invention comprises one or more compounds of the invention in combination with at least one olefin polymer stabilizer, and preferably, two or more such stabilizers. It is well known that in the case of olefin polymers, combinations of stabilizers can be complementary, and can enhance the resistance of the olefin polymer to oxidative deterioration. Such enhanced stabilizing effectiveness when present in the olefin polymer stabilizer combination continues to be evidenced in the presence of the compound or compounds of the invention.

Stabilizer systems of the invention comprising a compound of the invention and an olefin polymer stabilizer can be formulated and marketed as such, ready for use by the converter of the olefin polymer into useful products.

In another embodiment of the invention, as previously indicated, one or more compounds of the invention can be combined with the olefin polymer. Such compositions are readily marketed by the polymer manufacturer as an olefin polymer which can be used in contact with copper, and can be combined with the usual olefin polymer stabilizers by the converter in the usual way, without any modification whatsoever, so as to obtain the benefits of the invention due to the presence in the formulation of a compound of the invention. Such compositions have the special advantage that they can be processed using the usual techniques, and, in addition, the usual olefin polymer stabilizer systems will behave virtually in their normal way, even when the composition is in contact with copper.

The preferred stabilizer system of the invention comprises the compounds of the invention and two olefin polymer stabilizers, a phenol, and a thiodipropionic acid ester. An additional fourth ingredient which is included in the preferred systems of the invention but which is not essential is an organic phosphite, and a fifth optional ingredient is a polyvalent metal salt of an organic acid. The olefin polymer stabilizers together give an enhanced stabilization which is not obtainable from any of them alone or in combinations of two with the compound of the invention.

A further improvement in resistance to degradation is obtained if to the stabilizer composition of the invention there be added pentaerythritol and/or dipentaerythritol. Only a small amount is sufficient to give a noticeable improvement. From 0.5 to 10% is satisfactory.

The compounds of the invention are not olefin polymer stabilizers. However, where the compounds of the invention are employed in conjunction with an olefin polymer stabilizer, such as a phenol, and a thiodipropionic acid ester, and the olefin polymer is in contact with copper, the polymer's resistance to embrittlement and reduction in melt viscosity at elevated temperatures can be almost as high as though the copper were not present. An organic phosphite and/or a polyvalent metal salt, employed in conjunction with the phenol and thiodipropionic acid ester and compounds of the invention, can further enhance resistance of the polymer to discoloration in the present of copper. In many cases, an enhanced synergistic stabilizer activity is observed in such combinations.

The compound of the invention can minimize any catalytic effect of copper on the rate of degradation of the olefin polymer in the presence of olefin polymer stabilizers. Very small amounts can significantly reduce this effect. Amounts within the range from about 0.05 to about 5% by weight of the polypropylene are satisfactory. Preferably, from 0.5 to 2.5% is employed.

The amount of total stabilizer including the olefin polymer stabilizer and the compound of the invention is within the range from about 0.005 to about 5%, preferably from 0.1 to 2.5%. Of this, the olefin polymer stabilizer comprises from about 0.001 to about 10% by weight, and the compound of the invention from about 0.1 to about 5% by weight. The preferred olefin polymer stabilizer comprises from about 0.025 to about 0.5% of a phenol, from about 0.05 to about 1% of a thiodipropionic acid ester, and optionally, from about 0.05 to about 1.25% of a phosphite, and from about 0.025 to about 0.75% of a polyvalent metal salt, when present.

The compounds of the invention and the olefin polymer stabilizers may be formulated as a simple mixture for incorporation in the polymer by the polymer manufacturer or by the converter. An inert organic solvent can be used to facilitate handling, if the ingredients do not form a homogeneous mixture or solution.

Polypropylene solid polymer can be defined in a manner to differentiate it from other polyolefins as having a density within the range of from 0.86 to 0.91, and a melting point above 150° C. The stabilizer of the invention is applicable to all such polypropylenes, as distinguished from polypropylenes in the liquid form or in semiliquid or gel-like forms, such as are used as greases and waxes.

The stabilizer system of the invention is applicable to polypropylenes prepared by any of the various procedures, for the molecular weight and tacticity are not factors affecting this stabilizer. Isotactic polypropylene, available commercially under the trade names Profax, Escon and Olefane and having a softening or hot-working temperature of about 350° F., is an example of a sterically regular polypropylene polymer.

Mixtures of polypropylene with other compatible polymers and copolymers of propylene with copolymerizable monomers not reactive with oxalic acid also can be stabilized in accordance with this invention. For example, mixtures of polyethylene and polypropylene, and copolymers of propylene and ethylene which contain a sufficient amount of propylene to present the instability problem that is resolved by the stabilizer of the invention, may be stabilized by the addition of oxalic acid, alone or in combination with other polypropylene stabilizers.

The stabilizer systems of the invention may also be used with polyolefins higher than polypropylene, such as polybutylene and polyisobutylene.

The stablizer system is incorporated in the polymer in suitable mixing equipment, such as a mill or a Banbury mixer. If the polypropylene has a melt viscosity which is too high for the desired use, the polypropylene can be worked until its melt viscosity has been reduced to the desired range before addition of the stabilizer. However, polypropylenes in a range of workable melt viscosities are now available. Mixing is continued until the mixture is substantially uniform. The resulting composition is then removed from the mixing equipment and brought to the size and shape desired for marketing or use.

The stabilized polypropylene can be worked into the desired shape, such as by milling, calendering, extrusion or injection molding or fiber-forming. In such operations, it will be found to have a considerably improved resistance to reduction in melt viscosity during the heating, and well as a better resistance to discoloration and embrittlement on ageing and heating.

The following examples in the opinion of the inventors represent preferred embodiments of the stabilizer compositions and olefin polymer compositions of their invention.

EXAMPLES 1 TO 12

Polypropylene compositions were prepared, stabilized by combinations of compounds of the invention and known polypropylene stabilizers, and were evaluated for their resistance to oxidative degradation in the presence of copper. An accelerated oxidation test was employed, to determine the effective useful life of the polypropylene. The time required for a polypropylene sample to absorb 10 cc. of oxygen per gram of sample, when heated at 140° C. in a closed system, was determined. This time is the induction time.

The base olefin polymer composition tested was as follows:

TABLE I

| | Parts by weight |
|---|---|
| Polypropylene (Profax 6501) | 100 |
| 1,1,3-tris(2'-methyl-4'-hydroxy - 5' - tert-butyl)phenyl) butane | 0.05 |
| Distearyl thiodipropionate | 0.15 |
| Trinonylphenyl phosphite | 0.1 |
| Copper powder | 1.0 |

The components listed were mixed on a two roll mill and sheeted off to form 1 mm. sheets. To each sample, there was also added 0.5 part of the compound listed in Table II.

As Control A, the base composition was tested, without copper. As Control B, the base composition was tested with copper. As Control C, the base composition containing added oxanilide also was tested.

Table II below sets out the results of the test for each compound tested.

TABLE II

| Example No. | Compound | Induction time, hours |
|---|---|---|
| Control A (No copper) | None | >1,000 |
| Control B (With copper) | do | 20 |
| Control C | Oxanilide | 380 |
| 1 | HS—CH₂—C(=O)—NHNH₂ | 750 |
| 2 | HS—CH₂—C(=O)—NHNH—C(=O)—CH₂—SH | 550 |
| 3 | HS—CH₂—CH₂—C(=O)—NHNH—C(=O)—  | 800 |
| 4 | 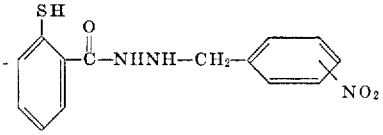 | 450 |
| 5 | 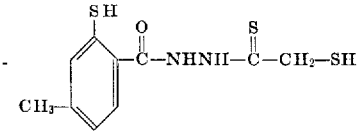 | 900 |
| 6 | HS—CH₂—C(=O)—NHNH—C(=S)—NH— 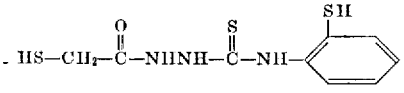 | 800 |
| 7 | HS—CH₂—CH₂—NH—C(=S)—NH—CH₂—CH₂—SH | 800 |
| 8 | HS—CH₂—CH₂—NH—C(=S)—NHNH—C(=O)— 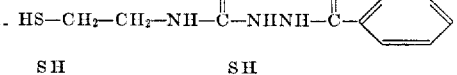 | 800 |
| 9 | 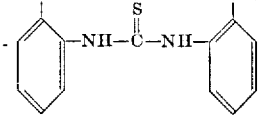 | 400 |
| 10 | H₂N—NH—C(=O)—CH₂CH₂—S—CH₂CH₂—C(=O)—NH—NH₂ | 520 |
| 11 | 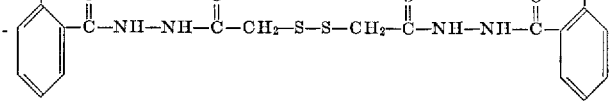 | 900 |
| 12 | H₂N—NH—C(=O)—CH₂—S—S—CH₂—C(=O)—NH—NH—C(=O)— 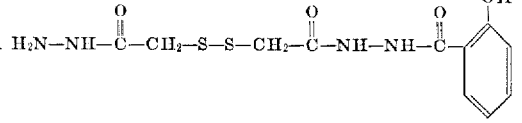 | 700 |

The improvement in resistance of the polypropylene to oxidative degradation is evident.

EXAMPLES 13 TO 19

The procedure described in Examples 1 to 12 was repeated with the exception that 0.2 part of pentaerythritol was incorporated in the polypropylene samples.

Table III below sets out the data obtained for each compound of the invention.

off to form milled sheets. Pieces cut from the milled sheets were compression molded at 190° C. for five minutes to give 6 x 6 inch slabs 20 mils thick. The molded samples were heated flat on aluminum foil in an air-circulating oven at 135° C. Samples were removed daily and examined for cracking which constitutes failure.

As Control D, as base composition (i.e. without the compound of the invention) was tested.

TABLE III

| Example No. | Compound | Induction time, hours |
|---|---|---|
| Control A (No pentaerythriol) (No copper). | None | >1,000 |
| Control B (No pentaerythritol) (With copper). | ...do... | 20 |
| 13 | HS—CH$_2$—C(=O)—NH—NH$_2$ | 980 |
| 14 | HS—CH$_2$—C(=O)—NH—NHNH—C(=O)—CH$_2$—SH | 750 |
| 15 | [SH, C(=O)—NHNH—CH$_2$—phenyl—NO$_2$ structure] | 580 |
| 16 | HS—CH$_2$—CH$_2$—NH—C(=O)—NHNH—C(=O)—[phenyl—OH] | 950 |
| 17 | [SH-phenyl—NH—C(=S)—NH—phenyl-SH] | 620 |
| 18 | [OH-phenyl—C(=O)—NHNH—C(=O)—CH$_2$—S—S—CH$_2$—C(=O)—NHNH—C(=O)—phenyl-OH] | >1,000 |
| 19 | [SH-phenyl—NH—C(=S)—NH—phenyl—S—S—phenyl—NH—C(=S)—NH—phenyl-SH] | 700 |

The improvement due to the pentaerythritol is evidenced by the data.

EXAMPLE 20

Polypropylene compositions were prepared, stabilized by a combination of a compound of the invention and known polypropylene stabilizers, and were evaluated for their resistance to degradation due to prolonged exposure to elevated temperatures in the presence of copper.

The base olefin polymer composition tested was as follows:

TABLE IV

| | Parts by weight |
|---|---|
| Polypropylene (Profax 6501) | 100 |
| 1,1,3-tris(2'-methyl-4'-hydroxy-5'-tertbutylphenyl)butane | 0.03 |
| Distearyl thiodipropionate | 0.17 |
| Copper powder | 1.0 |

0.5 part of the compound listed in Table V was also added.

The components listed were mixed on a two roll mill and fluxed for five minutes at 170±2° C. and sheeted Table V below sets out the results of the test.

TABLE V.—OVEN TEST

| Compound | Time to failure at 135° C., hours |
|---|---|
| Example No.: | |
| 20 [SH-phenyl—NH—C(=S)—NH—phenyl-SH] | 330 |
| Control D ......... None | <20 |

The improvement in resistance of the polyproplyene to degradation on long-term exposure to elevated temperatures is evident.

EXAMPLE 21

Polypropylene compositions were prepared, stabilized by a combination of one of the compounds of the invention and a known polypropylene stabilizer, and were evaluated for their resistance to degradation due to prolonged exposure to elevated temperatures in the presence of copper.

The base olefin polymer composition tested was as follows:

TABLE VI

| | Parts by weight |
|---|---|
| Polypropylene (Profax 6501) | 100 |
| 1,1,3-tri(2'-methyl-4'-hydroxy-5'-tertbutylphenyl)butane | 0.04 |
| Distearyl thiodipropionate | 0.26 |
| Cupric stearate | 0.1 |

0.5 part of the compound listed in Table VII was also added.

The components listed were mixed on a two roll mill and fluxed for five minutes at 170±2° C. and sheeted off to form milled sheets. Pieces cut from the milled sheets were compression-molded at 190° C. for five minutes to give 6 x 6 inch slabs 20 mils thick. The molded samples were heated flat on aluminum foil in an air-circulating oven at 160° C. Samples were removed daily and examined for cracking which constitutes failure.

As Control E, a sample containing 0.5 part 3-amino-1,2,4-triazole was tested.

Table VII below sets out the results of the test.

TABLE VII.—OVEN TEST

| Compound | Time to failure at 160° C., hours |
|---|---|
| Example No.: | |
| 21 ........ $HS-CH_2-\overset{O}{\overset{\|}{C}}-NHNH_2$ | 219 |
| Control E ........ 3-amino-1,2,4-triazole | 124 |

The improvement in resistance of the polypropylene to degradation on long-term exposure to elevated temperatures is evident.

EXAMPLES 22 AND 23

Polypropylene compositions were prepared, stabilized by combinations of compounds of the invention and known polypropylene stabilizers, and were evaluated for their resistance to degradation due to prolonged exposure to elevated temperatures in the presence of copper.

The base olefin polymer composition tested was as follows:

TABLE VIII

| | Parts by weight |
|---|---|
| Polypropylene (Profax 6501) | 100 |
| Tris-nonylphenyl phosphite | 0.1 |
| 1,1,3 - tris(2'-methyl-4'-hydroxy-5'-tert-butylphenyl)butane | 0.03 |
| Distearyl thiodipropionate | 0.17 |
| Cupric stearate | 0.1 |

To each sample there was also added 0.5 part of the compounds listed in Table IX.

The components listed were mixed on a two-roll mill and fluxed for five minutes at 170±2° C. and sheeted off to form milled sheets. Pieces cut from the milled sheets were compression molded at 190° C. for five minutes to give 6 x 6 inch slabs 20 mils thick. The molded samples were heated flat on aluminum foil in an air-circulating oven at 160° C. Samples were removed daily and examined for cracking which constitutes failure.

As Control F, a base composition (i.e. without the compound of the invention) was tested:

Table IX below sets out the results of the test.

TABLE IX.—OVEN TEST

| Compound | Time to failure at 160° C. hours |
|---|---|
| Example No.: | |
| 22 ........ $HS-CH_2-\overset{O}{\overset{\|}{C}}-NHNH-\overset{O}{\overset{\|}{C}}-CH_2-SH$ | 161 |
| 23 ........ $H_2NNH-\overset{O}{\overset{\|}{C}}-CH_2CH_2-S-CH_2CH_2-\overset{O}{\overset{\|}{C}}-NHNH_2$ | 137 |
| Control F ........ None | 17 |

The improvement in resistance of the polypropylene to degradation on long-term exposure to elevated temperatures is evident.

EXAMPLE 24

Polypropylene compositions were prepared, especially formulated for use in contact with copper, by the incorporation of one of the compounds of the invention. Such compositions can be marketed as such, and when mixed with polypropylene stabilizers will have an enhanced resistance to copper-catalyzed degradation in physical properties.

The components were mixed on a two roll mill and fluxed for five minutes at 170±2° C. and sheeted off. The sheets were reduced to particulate form ready for marketing as such.

The polypropylene compositions thus prepared were stabilized by incorporation of a two component stabilizer system recommended for use with the compounds of the invention. The resin particles were fluxed on a two roll mill at 170±2° C. and then there were added 0.04 part 1,1,3-tri(2'-methyl-4'-hydroxy-5'-tert-butylphenyl) butane, 0.26 part distearyl thiodipropionate and 0.1 part copper stearate, after which the composiiton was fluxed for five minutes and sheeted off. Pieces cut from the milled sheets were compression-molded at 190° C. for five minutes to give 6 x 6 inch slabs 20 mils thick. The molded samples were heated flat on aluminum foil in an air-circulating oven at 160° C. Samples were removed daily and examined for cracking which constitutes failure.

As Control G, a sample containing 0.5 part 3-amino-1,2,4-triazole was tested.

Table X below sets out the results of the test.

TABLE X.—OVEN TEST

| Compound | Time to failure at 160° C., hours |
|---|---|
| Example No.: | |
| 24 ........ $HS-CH_2-\overset{O}{\overset{\|}{C}}-NHNH_2$ | 221 |
| Control G ........ 3-amino-1,2,4-triazole | 130 |

The improvement in resistance of the polypropylene to degradation on long-term exposure to elevated temperatures is evident.

EXAMPLE 25

Polypropylene compositions were prepared, stabilized by combinations of compounds of the invention and known polypropylene stabilizers, and were evaluated for their resistance to degradation due to prolonged exposure to elevated temperatures in the presence of copper.

The base olefin polymer composition tested was as follows:

TABLE XI

| | Parts by weight |
|---|---|
| Polypropylene (Profax 6501) | 0.17 |
| Tris-nonylphenyl phosphite | 0.1 |
| Distearyl thiodipropionate | 0.17 |
| 1,1,3 - tris(2'-methyl-4'-hydroxy-5'-tert-butylphenyl) butane | 0.03 |
| Cupric stearate | 0.1 |

To each sample there was also added 0.5 part of one of the compounds listed in Table XII.

The components listed were mixed on a two-roll mill and fluxed for five minutes at 170±2° C. and sheeted off to form milled sheets. Pieces cut from the milled sheets were compression molded at 190° C. for five minutes to give 6 x 6 inch slabs 20 mils thick.

Molded samples were heated flat on aluminum foil in an air-circulating oven at 150° C. and 160° C. Samples were removed daily and examined for cracking which constitutes failure.

As Control H, a sample containing 0.5 part 3-amino-1,2,4-triazole was tested.

Table XII below sets out the results of the test.

TABLE XII.—OVEN TEST

| Example No.: | Compound | Time to failure, hours | |
|---|---|---|---|
| | | 150° C. | 160° C. |
| 25 | HS—CH$_2$—C(=O)—NHNH$_2$ | 124 | 66 |
| Control H | 3-amino-1,2,4-triazole | 41 | 17 |

The improvement in resistance of the polypropylene to degradation on long-term exposure to elevated temperatures is evident.

The following examples illustrate preferred embodiments of the procedure for preparing mercapto and thio hydrazides and/or ureides of the invention.

EXAMPLE A

Mercapto acethydrazide

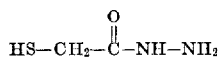

was prepared as follows:

35.2 g. (0.55 mole) of 80% hydrated hydrazine was dissolved in 50 ml. of ethanol. The solution was heated to 78° C., 60 g. (0.50 mole) of ethylthioglycolate added, and heating was continued for 5 hrs. at 78–80° C. After the reaction, ethanol, water and unreacted hydrazine were removed at reduced pressure. A yellow viscous liquid was obtained which was found to be a mixture of mercapto acethydrazide and small amounts of unreacted starting materials.

EXAMPLE B

Bis-mercapto acethydrazide

was prepared as follows:

64 g. (1 mole) of 80% hydrated hydrazine was dissolved in 50 ml. of ethanol, and this solution was heated to 78° C. and reacted with 240 g. (2 moles) of ethylthioglycolate for five hours at 78–80° C. A gel-like substance was obtained which was N,N'-di(α-mercapto acetyl) hydarzine including a small amount of impurities.

EXAMPLE C

β-Mercapto propiono-o-hydroxybenzoyl-bis-hydrazide

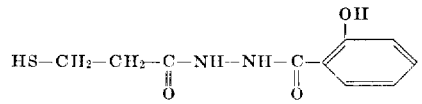

was prepared as follows:

67 g. (0.5 mole) of ethyl β-mercapto propionate was reacted with 35.2 g. (0.55 mole) of 80% hydrated hydrazine dissolved in 50 ml. of ethanol at 78° C. for five hours to form β-mercapto propionic hydrazide. 60 g. (0.5 mole) of β-mercapto-propionic hydrazide was charged into 3-necked flask. 50 g. of ethanol and 68 g. (0.50 mole) of methylsalicylate were added to the flask, and reacted together at about 80° C. for 15 hours. After cooling, the precipitate was filtered, washed with ether and then dried.

The product was obtained in good yield.

EXAMPLE D

Bis-N-β-mercapto ethyl thioureide

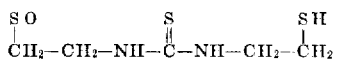

was prepared as follows:

77 g. (1 mole) of β-mercaptoethylamine and 76 g. (1 mole) of carbon disulfide were reacted in the presence of 150 g. of ethanol and 10 g. of KOH under reflux until liberation of hydrogen sulfide ceased. Excess carbon disulfide and ethanol were distilled. The resulting solid was washed with ether and water, and dried at reduced pressure.

EXAMPLE E

Bis-N-o-mercaptophenyl-thioureide

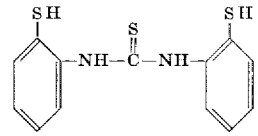

was prepared as follows:

124 g. (1.0 mole) of o-aminothiophenol and 100 g. of ethanol were charged into 3-necked flask. 76 g. of carbon disulfide and 15 g. of KOH were added to the flask, and reaction was carried out under reflux for about 30 hours until evolution of hydrogen sulfide ceased. The precipitate formed was filtered, washed with water and ether, and then dried.

EXAMPLE F

Bis-(β-propiono hydrazide) sulfide

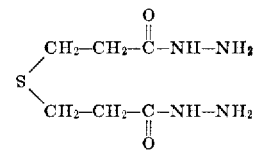

was prepared as follows:

11.7 g. (0.05 mole) of diethylthiodipropionae and 13 g. (0.2 mole) of 80% hydrated hydrazine were reacted in 150 ml. of ethanol at reflux temperature for 15 hours. A fine white precipitate was obtained which was filtered, washed with ethanol and ether and dried.

EXAMPLE G

N-nitrobenzyl-o-mercapto benzoylhydrazide

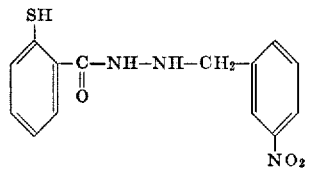

was prepared as follows:

91 g. (0.5 mole) of ethyl-o-mercaptobenzoate in 100 g. of ethanol was reacted with 256 g. (4 moles) of 80% hydrated hydrazine at reflux temperature to form o-mercaptobenzoic hydrazide. The hydrazide was then reacted with 93 g. (0.5 mole) of nitrobenzylchloride in the presence of 40 g. of pyridine and 100 g. of ethanol at refluxing temperature for 10 hours. After cooling to room temperature, aqueous sodium carbonate solution was added, and the precipitate was filtered, washed with cold water and ethanol, and then dried.

EXAMPLE H

Mercapto acethydrazide - N - o - mercaptophenyl-thioureide

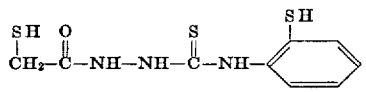

was prepared as follows:

53 g. (0.5 mole) of the mercapto acethydrazide of Example A, 100 ml. of ethanol and 0.5 mole of o-mercaptoaniline were mixed and 10 g. of KOH was added to the mixture. 38 g. (0.5 mole) of carbon disulfide was added to the mixture and reaction was continued under reflux until evolution of hydrogen sulfide ceased. Excess carbondisulfide and ethanol were distilled off, and a precipitate was obtained which was washed with water and dried.

EXAMPLE I

N-β-mercaptoethyl-N'-salicyl-amidoureide

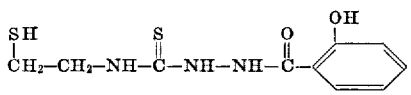

was prepared as follows:

76 g. (0.5 mole) of salicyclic hydrazide, 38.5 g. (0.5 mole) of β-mercaptoethylamine, and 100 g. of ethanol were charged into a 3-necked flask. 114 g. (1.50 moles) of carbon disulfide and 11.4 g. of potassium hydroxide were added to the flask at refluxing temperature. Reaction of the mixture continued for about 30 hours until evolution of hydrogen sulfide ceased. Excess carbon disulfide and ethanol were distilled off, and the precipitate was separated by filtration, dissolved in hot water and recrystallized by cooling. A mixture of ureides was obtained having the following structures:

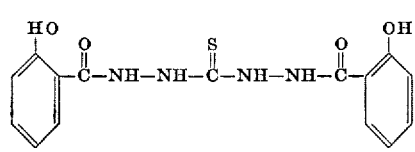

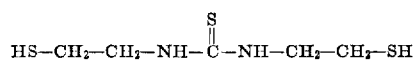

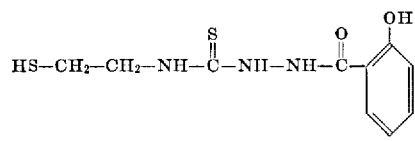

EXAMPLE J

A dithio bis-hydrazide of the formula

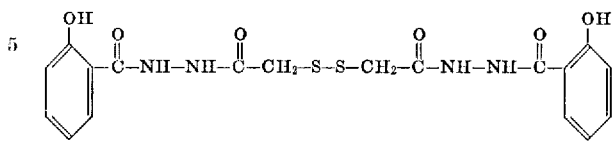

was prepared as follows:

0.3 mole of N-mercaptoacetyl-N'-orthohydroxybenzoylhydrazine prepared as described in Example C was dissolved in a mixture of 100 ml. of ethanol and hexamethyl phosphoric triamide and 0.3 mole of hydrogen peroxide was added slowly under reflux. The precipitate was filtered and dried.

EXAMPLE K

A dithio-bis thioureide of the formula

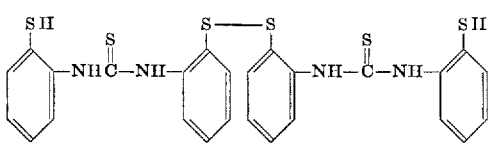

was prepared as follows:

0.5 mole of

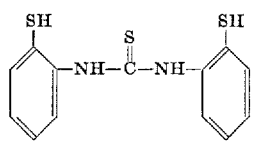

prepared as described in Example E was dissolved in a mixture of 100 ml. of ethanolhexamethyl phosphoric triamide and 0.5 mole of hydrogen peroxide was added slowly at refluxing temperature. A precipitate was formed which was filtered, washed with water and ether, and then dried.

EXAMPLE L

A thio hydrazide-ureide of the formula

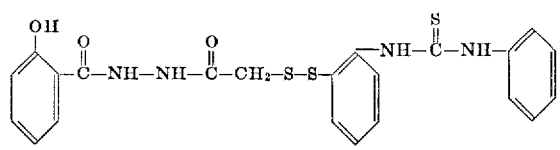

was prepared as follows:

0.5 mole of

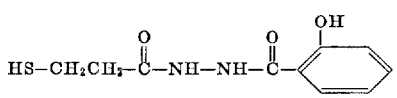

(prepared as described in Example C), 0.5 mole of

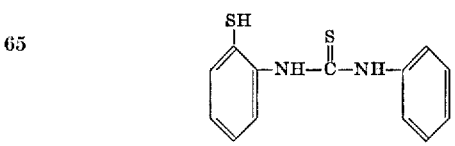

(prepared by the reaction of equal proportions of phenylamine and o-aminothiophenol with carbon disulfide in a manner similar to Example E) with 1.0 mole of hydrogen peroxide was reacted in a manner similar to the procedure described in Example K. The product obtained was a mixture of the mixed hydrazide-ureide of the above formula, a thio hydrazide of the formula

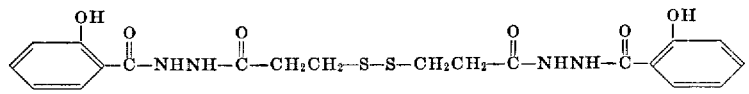

and a thio ureide of the formula

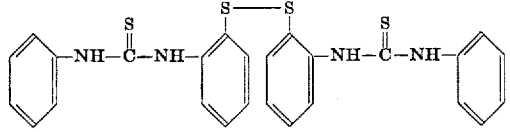

Having regard to the foregoing disclosure, the following is claimed as the inventive and patentable embodiments thereof:

1. A stabilizer combination useful in the enhancement of the resistance of α olefin polymers to copper-catalyzed oxidative deterioration, consisting essentially of at least one member of the group consisting of compounds having the following structures:

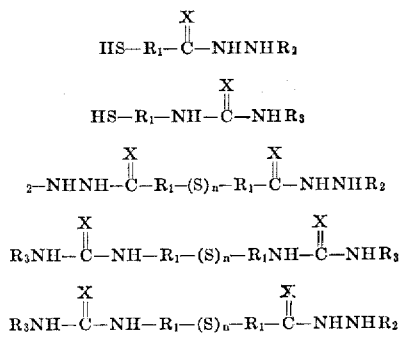

wherein

X is selected from the group consisting of oxygen or sulfur;

$n$ is an integer of from 1 to 2;

$R_1$ is a bivalent group selected from the group consisting of alkylene radicals containing from one to about two carbon atoms and alkylene radicals including as substituents alkyl having from one to about twelve carbon atoms, aryl having from six to about ten carbon atoms, hydroxyl, and halogen groups, and arylene radicals containing from about six to about ten carbon atoms, and such radicals including the substituents named above, nitro and alkoxy having from one to about twelve carbon atoms;

$R_2$ is selected from the group consisting of hydrogen, alkyl having from one to about twelve carbon atoms, aryl having from six to about ten carbon atoms, and alkaryl and aralkyl having from seven to about ten carbon atoms, and such radicals including any of the above substituents, and mercapto,

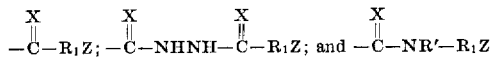

wherein Z is selected from the group consisting of hydrogen, hydroxyl and mercapto groups; and R′ is selected from the group consisting of hydrogen and alkyl radicals having from one to about four carbon atoms, and X and $R_1$ are as defined above; and $R_3$ is selected from the group consisting of hydrogen,

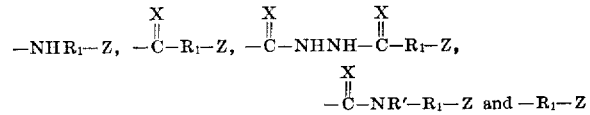

wherein Z, $R_1$ and R′ are as defined hereinbefore; and wherein each of the above structures, the R's and X's in the same compound may be the same or different; and at least one α olefin polymer stabilizer, the stabilizer being compatible with polypropylene and having a low vapor pressure at olefin polymer working temtures and selected from the group consisting of phenols, organophosphites, thiopropionic acid esters, polyvalent metal salts of organic acids, and hydrocarbon monosulfides and polysulfides; and α-olefin polymer light stabilizers.

2. A stabilizer combination in accordance with claim 1 wherein the α olefin polymer stabilizer is a phenol.

3. A stabilizer combination in accordance with claim 1 wherein the α olefin polymer stabilizer is a thiodipropionic acid ester.

4. A stabilizer combination in accordance with claim 1 wherein the α olefin polymer stabilizer is a combination consisting essentially of a phenol and a thiodipropionic acid ester.

5. A stabilizer combination in accordance with claim 1 including an organic phosphite.

6. A stabilizer combination in accordance with claim 4 including an organic phosphite.

7. α Olefin polymer compositions which when combined with one or more α olefin polymer stabilizers have an enhanced resistance to copper-catalyzed degradation in physical properties, consisting essentially of an α olefin polymer and at least one member selected from the group consisting of compounds having the following structures:

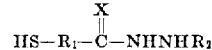

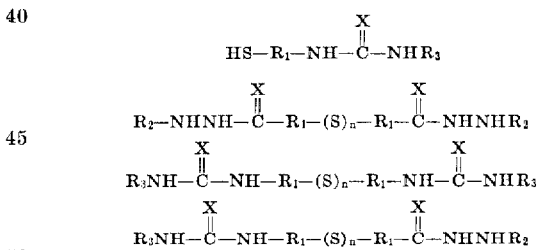

wherein

X is selected from the group consisting of oxygen or sulfur;

$n$ is an integer of from 1 to 2;

$R_1$ is a bivalent group selected from the group consisting of alkylene radicals containing from one to about two carbon atoms and alkylene radicals including as substituents alkyl having from one to about twelve carbon atoms, aryl having from six to about ten carbon atoms, hydroxyl, and halogen groups, and arylene radicals containing from about six to about ten carbon atoms, and such radicals including the substituents named above, nitro and alkoxy having from one to about twelve carbon atoms;

$R_2$ is selected from the group consisting of hydrogen, alkyl having from one to about twelve carbon atoms, aryl having from six to about ten carbon atoms, and alkaryl and aralkyl having from seven to about ten carbon atoms, and such radicals including any of the above substituents, and mercapto,

wherein Z is selected from the group consisting of hydrogen, hydroxyl and mercapto groups; and R′ is selected from the group consisting of hydrogen and alkyl radicals having from one to about four carbon atoms, and X and $R_1$ are as defined above; and $R_3$ is selected from the group consisting of hydrogen,

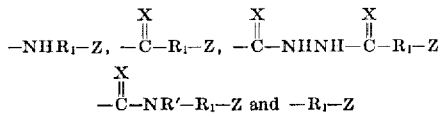

$$-\underset{\underset{\text{II}}{\text{O}}}{\text{C}}-\text{NR}'-\text{R}_1-\text{Z} \text{ and } -\text{R}_1-\text{Z}$$

wherein Z, $R_1$ and R' are as defined hereinbefore; and wherein in each of the above structures, the R's and X's in the same compound may be the same or different.

8. An α olefin polymer composition in accordance with claim 7 wherein the α olefin polymer is a propylene polymer.

9. An α olefin polymer composition in accordance with claim 8 wherein the propylene polymer is polypropylene.

10. An α olefin polymer composition in accordance with claim 7 including, in addition, at least one olefin polymer stabilizer, and selected from the group consisting of phenols, organophosphites, thiodipropionic acid esters, polyvalent metal salts of organic acids, and hydrocarbon sulfides and polysulfides, and α-olefin polymer light stabilizers.

11. An α olefin polymer composition in accordance with claim 10, wherein the olefin polymer stabilizer is a phenol.

12. An α olefin polymer composition in accordance with claim 10, wherein the α olefin polymer stabilizer is a thiodipropionic acid ester.

13. An α olefin polymer composition in accordance with claim 10 wherein the α olefin polymer stabilizer is a combination of a phenol and a thiodipropionic acid ester.

14. An α olefin polymer composition in accordance with claim 10 wherein the α olefin polymer stabilizer is a combination of a phenol, a thiodipropionic acid ester, and an organic phosphite.

15. An α olefin polymer composition in accordance with claim 10 wherein the α olefin polymer stabilizer is a combination of a phenol, a thiodipropionic acid ester, an organic phosphite and a polyvalent metal salt of an organic acid.

References Cited

UNITED STATES PATENTS 3,160,680  12/1964  Tholstrup _____ 260—45.85
3,181,971  5/1965   Rayner _____ 260—45.9

DONALD E. CZAJA, Primary Examiner

V. P. HOKE, Assistant Examiner

U.S. Cl. X.R.

117—232; 252—402, 403, 404, 406; 260—45.7, 45.75, 45.8, 45.9, 45.95, 551, 552, 553, 558, 561

PO-1050
(5/69)

UNITED STATES PATENT OFFICE
CERTIFICATE OF CORRECTION

Patent No. 3,549,572      Dated   December 22, 1970

Inventor(s) Motonobu Minagawa and Kenichi Nakagawa

It is certified that error appears in the above-identified patent and that said Letters Patent are hereby corrected as shown below:

Column 2, line 2, "present" should be --presence--; line 70, that part of the formula reading

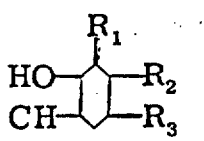   should read   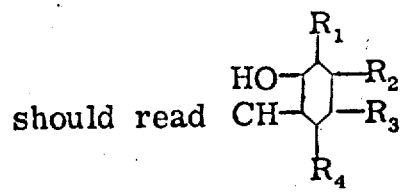

Column 3, line 48, "stabiltiy" should be --stability--. Column 4, line 40, please delete end bracket (]). Column 5, line 12, "ploymer" should be --polymer--; line 30, structure IV, that part of the formula reading

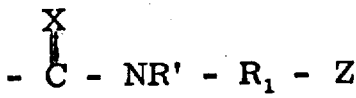

line 38, "substituent" should be --substituents--; lines 60 to 63, before "and", please insert the formula $$-\overset{X}{\underset{}{C}} - NR' - R_1 - Z$$

Column 6, line 66, that part of the formula reading

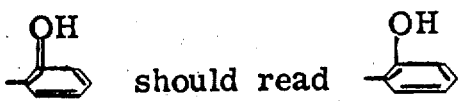

Column 7, line 11, formula 10, that part of the formula reading

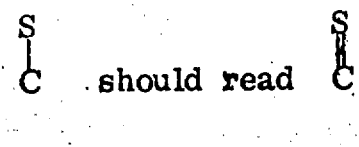

PO-1050
(5/69)

UNITED STATES PATENT OFFICE
CERTIFICATE OF CORRECTION

Patent No. 3,549,572                Dated   December 22, 1970

Inventor(s) Motonobu Minagawa and Kenichi Nakagawa

It is certified that error appears in the above-identified patent and that said Letters Patent are hereby corrected as shown below:

Column 8, line 15, formula 27, that part of the formula reading

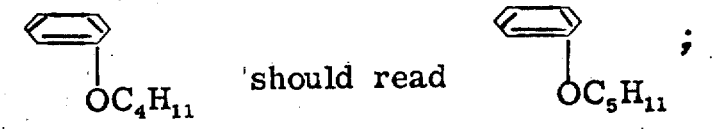

Column 9, line 5, formula 37, that part of the formula reading

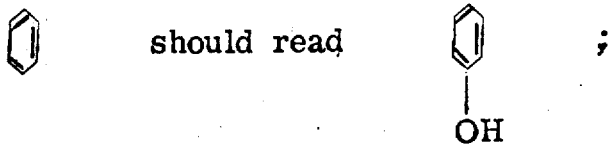

line 9, "know" should be --known--; line 47, that part of the formula reading "NHNHR" should read --NHNHR$_2$--; line 53, the formula reading

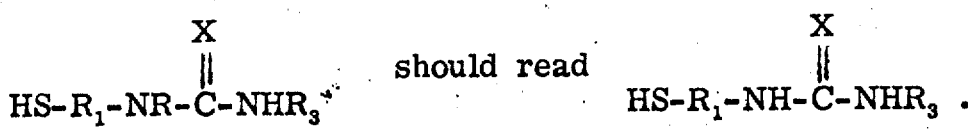

PO-1050
(5/69)

UNITED STATES PATENT OFFICE
CERTIFICATE OF CORRECTION

Patent No. 3,549,572            Dated December 22, 1970

Inventor(s) Motonobu Minagawa and Kenichi Nakagawa

It is certified that error appears in the above-identified patent and that said Letters Patent are hereby corrected as shown below:

Column 11, line 24, "phosphine" should be --phosphite--. Column 13, line 9, that part of the formula reading

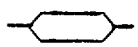  should read    ;

line 21, please delete the second formula reading  $-\underset{\underset{C_2H_5}{|}}{C}H-$ ;

line 34, that part of the formula reading "CH$_2$-CH" should read --CH$_3$-CH--. Column 14, line 64, "naphthy" should be --naphth Column 17, line 49, "present" should be --presence--. Column line 47, "and" should be --as--. Column 21, line 3 of Table II "pentaerythriol" should be --pentaerythritol--. Column 22, line "polyproplyene" should be --polypropylene--. Column 25, line "0.17" should be --100--; lines 74-75, "hydarzine" should be --drazine--. Column 26, line 26, that part of the formula reading $\underset{CH_2}{\overset{SO}{|}}$   should read   $\underset{CH_2}{\overset{SH}{|}}$ ;

line 71, "diethylthiodipropionae" should be --diethylthiodipropion Column 27, line 2, after "N-", please insert -- -m- --; line 4 "salicyclic" should be --salicylic--; line 61, that part of the fo reading

  should read  

UNITED STATES PATENT OFFICE
CERTIFICATE OF CORRECTION

Patent No. 3,549,572                    Dated December 22, 1970

Inventor(s) Motonobu Minagawa and Kenichi Nakagawa

It is certified that error appears in the above-identified patent and that said Letters Patent are hereby corrected as shown below:

Column 29, line 32, the beginning of the formula reading "$_2$" should be --$R_2$--. Column 31, line 20, after "one", please inser --$\alpha$--; line 27, after "the", please insert --$\alpha$--.

Signed and sealed this 28th day of September 1971.

(SEAL)
Attest:

EDWARD M. FLETCHER, JR.                 ROBERT GOTTSCHALK
Attesting Officer                       Acting Commissioner of Pat

PO-1050
(5/69)

UNITED STATES PATENT OFFICE
CERTIFICATE OF CORRECTION

Patent No. 3,549,572   Dated December 22, 1970

Inventor(s) Motonobu Minagawa and Kenichi Nakagawa

It is certified that error appears in the above-identified patent and that said Letters Patent are hereby corrected as shown below:

Column 30, line 14, "thiopropionic" should be
-- thiodipropionic --

Signed and sealed this 4th day of January 1972.

(SEAL)
Attest:

EDWARD M. FLETCHER, JR.
Attesting Officer

ROBERT GOTTSCHALK
Acting Commissioner of Patents